United States Patent [19]
Wilhelm, Jr.

[11] 3,881,651
[45] May 6, 1975

[54] CONTROL SYSTEM AND METHOD FOR AVERAGE VALUE SETPOINT

[75] Inventor: Robert G. Wilhelm, Jr., Columbus, Ohio

[73] Assignee: Industrial Nucleonics Corporation, Columbus, Ohio

[22] Filed: Nov. 12, 1973

[21] Appl. No.: 414,833

[52] U.S. Cl. ... 235/151.13; 235/151.1; 235/151.33; 425/140
[51] Int. Cl............................ G06g 7/66; G06f 15/46
[58] Field of Search......... 235/150.1, 151.33, 151.1, 235/151.33, 151.35; 425/140, 141, 145, 149

[56] References Cited
UNITED STATES PATENTS
3,666,621    5/1972    Adams............................ 235/151.3

*Primary Examiner*—Felix D. Gruber
*Attorney, Agent, or Firm*—William T. Fryer, III; Allan M. Lowe; C. Henry Peterson

[57] ABSTRACT

The average value of a material property is controlled by selectively varying a setpoint for the average value. The setpoint is controlled by deriving signals indicative of percentages of property samples having property values outside of a predetermined reject limit. The samples are taken over several, different length time intervals, with the signals for the different length intervals being derived in a period no greater than the shortest interval. A variable deadband is provided for each of the signals, and the width of the deadband is dependent upon the length of the different time intervals for each of the signals. The deadband is arranged so that a finite, non-zero control signal proportional to the magnitude of the signal indicative of the percentage is derived in response to the deadband being exceeded. In response to the control signal, the setpoint for the average value, and thereby the average value of the property, is controlled.

5 Claims, 1 Drawing Figure

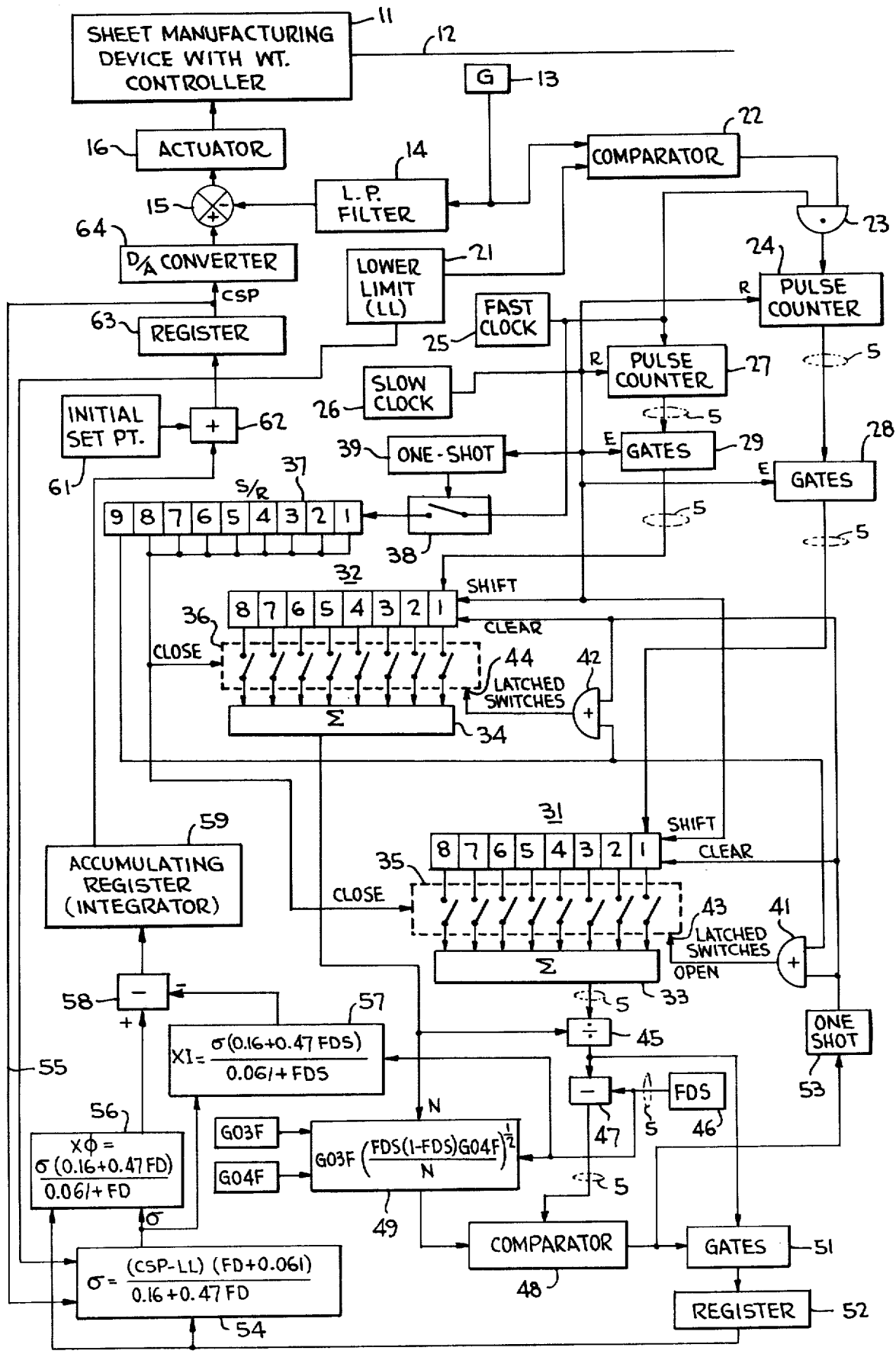

CONTROL SYSTEM AND METHOD FOR AVERAGE VALUE SETPOINT

FIELD OF INVENTION

The present invention relates generally to systems and methods for controlling a setpoint for the average value of a material property and, more particulary, to a system and method wherein the average value setpoint is controlled in response to signals indicative of spreads of values of a property value over several (more than two) different time intervals.

BACKGROUND OF THE INVENTION

It is known that the average value of a material property is desirably controlled as a function of the statistics of the property. In general, as the spread of property values decreases, the average value setpoint can be translated toward a limit value, and as the spread of values increases the average value setpoint is translated away from a limit value. The spread of values can be determined by the variance or square of the standard deviation of the property values, or by determining the amount of material that is considered to have a value outside of a limit value; the latter type of system for determining the spread of values is frequently referred to as fraction or percent defective. Systems of this general nature are disclosed in U.S. Pat. Nos. 3,515,860, 3,622,448, 3,648,035, and in the copending application of David A. Spitz entitled "Control System", commonly assigned with the present invention.

In these prior art systems it is generally the practice to periodically compute the spread of average values and change the average value setpoint in response to the periodically derived spread of values indication. Systems of this type generally have the disadvantage of not being capable of responnding to transient changes in the property being measured, due for example to inhomogeneity of the material forming the product or changes in the characteristics of the machine forming the product. In addition, if a gradual change in the material property being measured should occur, and the gradual change occurs toward the end of the period, the effects of the gradual change are not reflected in a change of average value setpoint for, perhaps, a considerable length of time. These prior art systems have the further disadvantage that changes in the average value setpoint are performed occasionally when there is no need to make such changes.

To rectify certain problems inherent in the prior art devices, as exemplified by the three aforementioned patents, there is disclosed in the copending application of Somerville et al., Ser. No. 346,034, filed Mar. 29, 1973, for "Control System For Average Value Setpoint", commonly assigned with the present invention, a system wherein changes in the average value setpoint are performed only when needed in response to either relatively long term or short term changes in the statistics of a material property being measured. The improvement disclosed in the copending Somerville et al application enables changes to be made in the average value setpoint in response to sudden statistical variations of the measured propety because an indication of spread of values is derived after each relatively short time interval and this indication selectively controls a setpoint value if it exceeds a relatively large deadband. The approach taken by Somerville et at generally decreases the time for response to long term errors by providing a variable control period that is controlled in response to accummulated spread of values indications in combination with a variable deadband that decreases as the length of time increases from the last change in setpoint. However, in response to the spread of values being at steady state and no change in the average value setpoint being made for a relatively long time period, the Somerville et al. system has a tendency to be insensitive to sudden small or moderate changes in the spread of values. The insensitivity arises since small or moderate changes in the spread of values are often too small to initiate a change in the average value setpoint on a short term basis. Since these changes are averaged in with a large number of old data they do not have a significant cumulative effect.

BRIEF DESCRIPTION OF THE INVENTION

In accordance with the present invention, the enumerated problems of the Somerville et al. system are obviated by deriving signals indicative of the spreads of values of a monitored property, with one signal being derived for each of several, i.e., more than two, different time intevals. All of the signals indicative of the spreads of values are derived in a time period no greater than one of the time intervals and there-by are effectively examined in rapid sequence, compared to variations of the monitored property. By considering one, two or several signals indictive of the spreads of values over different time intervals, the system is responsive to statistical variations that occur on a short term, medium term, and long term basis.

As in the Somerville et al. invention, the spreads of values signals for the different time intervals are supplied to A device having a variable deadband which is an inverse function of the length of each of the different time intervals. The present invention, therefore, provides a system capable of automatically changing an average value setpoint in response to the spread of process property values in the shortest possible time consistent with a specified probability that a control correction is required.

It is, accordingly, an object of the present invention to provide a new and improved system for and method of controlling an average value setpoint for a property as a function of the spread of the property values.

Another object of the invention is to provide a new and improved system for controlling a setpoint average value for a property in response to statistical variations of the property so that the setpoint value responds to changes in the statistical variations of the property in the shortest possible time consistent with a specified probability that a correction in the setpoint value is required.

A further object of the invention is to provide a new and improved system for and method of controlling a setpoint average value for a property in response to short term, medium term, and long term statistical variations of the property.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

The sole FIGURE is a schematic, block diagram of an embodiment of the invention as applied to a sheet manufacturing device.

DETAILED DESCRIPTION OF THE DRAWING

Reference is now made to the FIGURE wherein there is illustrated a sheet manufacturing device 11 having capabilities for controlling a property, the weight, of the sheet 12 produced by the device. Device 11 may be any conventional sheet manufacturing device, such as a papermaking facility, a plastic extruder, or a device for coating a preformed sheet. If device 11 is a papermaking machine, the weight of the paper sheet is controlled by varying a stock value; if device 11 is an extruder for producing plastic sheet, the sheet weight is controlled by varying the speed with which plastic material is fed to the extruder, as well as the speed with which the plastic sheet is pulled away from the extruder; if the device 11 is utilized for coating a preformed sheet, the device 11 includes a controller for the amount of coating material supplied to the preformed sheet. It is to be understood that the principles of the invention are applicable to manfacturing processes other than sheets, as long as it is possible to measure a property of the produced product and control that property.

To derive an indication of a property affected by a controller for the weight of sheet 12, a gauge 13 is positioned downstream of device 11. Typically, gauge 13 is a device to measure the weight, thickness or density of sheet 12 and may comprise a nucleonic gauge, as specifically disclosed in the aforementioned Sommeville et al. application. Gauge 13 is frequently scanned across the width of sheet 12, between the edges of the sheet, although such scanning is not illustrated in the figure, to simplify the exposition.

The output signal of gauge 13 is supplied to low pass filter 14, which removes noise and high frequency variations from the output of gauge 13 to derive an analog signal indicative of the monitored weight of sheet 12. The output signal of filter 14 is supplied as a subtrahend input to analog subtractor circuit 15, having a minuend input indicative of a setpoint or target value for the weight of sheet 12. Subtractor circuit 15 derives an analog signal indicative of the error between the setpoint value for the sheet weight and the measured value, as derived from filter 14, and this output signal is supplied to actuator 16 that is capable of varying a weight controller of device 11 for sheet 12. Hence, if device 11 is a papermaking machine, actuator 16 provides a drive for a stock valve feeding a fibrous slurry into the papermaking machine headbox.

The present invention is concerned with a new and improves system and method for deriving the setpoint input signal for the average value of the sheet weight, as coupled to the minuend input terminal of subtractor circuit 15. the setpoint signal is dependent upon the spread of values of the output of gauge 13, as indicated by the percent or fraction of defective material, relative to a predetermined lower limit value, as derived from lower limit source 21. The setpoint input signal to subtractor circuit 15 can be derived either on a short term, long term or medium term basis, depending upon the nature of the statistical variations of the output of gauge 13, and responds to changes in the spread of values derived from gauge 13 in the shortest possible time consistent with a specified probability that a change in setpoint is required.

To these ends, the analog output signal of gauge 13 is compared in comparator 22 with constant d.c. voltage derived from lower limit source 21 and indicative of a value for the weight of sheet 12 beyond which the sheet is considered defective. Hence, if the output of gauge 13 is less than the lower limit value of source 21, the sheet 12 is considered as defective. It is desired to produce a certain percentage or amount of defective sheet and control the setpoint to achieve this percentage, as described in the aforementioned patents. Comparator 22 derives a bilevel output, having a binary one value in response to the output of gauge 13 being less than the lower limit of source 21 and a binary zero value in response to the gauge output being greater than or equal to the lower limit. Thereby, comparator 22 derives a binary one output signal whenever sheet 12 indicated by gauge 13 to be defective.

To determine an indication of the amount of defective material in sheet 12, the output of comparator 22 is selectively coupled through AND gate 23 to binary pulse counter 24. AND gate 23 is enabled in response to pulses derived from fast clock source 25, which derives output pulses at the cut-off frequency of gauge 13. Gauge 13 can be considered as deriving a frequency specturm having a low pass filter characteristic, whereby pulses are derived from source 25 at a frequency approximately equal to the highest frequency in the output of gauge 13. Thereby, each binary one output signal of AND gate 23 is accurately considered as a sample for each defective portion of sheet 12 for which gauge 13 derives an output.

The defect samples are counted in binary counter 24, which derives a multi-bit, parallel output signal. In the system illustrated in the figure, counter 24 includes five parallel binary output leads, to provide a count from zero to thirty-one. Counter 24 is periodically reset in response to pulses from a source 26 of slow clock pulses. If gauge 13 is a scanning gauge, source 26 derives an output pulse each time that the gauge scans between the edges of sheet 12, a time interval that is typically between one-half and two minutes. In the illustrated embodiment, sources 25 and 26 have a 30:1 frequency ratio, whereby one pulse is derived from source 26 for every thirty pulses derived from source 25 to enable virtually the maximum count of counter 24 to be achieved.

To derive an indication of the total number of samples examined by gauge 13, compared to the number of defective samples, the output signal of fast clock pulse source 25 is supplied to pulse counter 27, which is similar to counter 24. Counters 24 and 27 both include a reset input terminal responsive to slow clock pulse source 26.

To provide indications of the total number of samples and number of defective samples counted by counters 24 and 27 between the occurrence of adjacent slow clock pulses from source 26 (which defines a sampling interval), the counts stored in counters 24 and 27 are respectively supplied to gates 28 and 29 which are enabled in response to the leading edge of each pulse from slow clock source 26. Counters 24 and 27 are reset in response to the trailing edge of each slow clock pulse from source 26, whereby the counters store signals indicative of the number of defective samples and total number of samples at the time gates 28 and 29 are enabled. Each of gates 28 and 29 actually includes five gates, one for each of the output leads of counters 24 and 27, and these gates are all enabled in parallel in response to the leading edge of each output pulse of slow clock source 26.

The multi-bit signals coupled through gates 28 and 29 are applied to memories 31 and 32, respectively. Memories 31 and 32 include several (more than two) storage cells, and in the illustrated embodiment eight such cells are provided. Each of the cells of memories 31 and 32 includes a memory element for one bit of the five-bit signal fed thereto. The five-bit signals from gates 28 and 29 are loaded into the first cell of memories 31 and 32 (the cells indicated on the right side of the figure). The contents of each cell are shifted to the next higher cell each time that a sampling interval has been completed, as indicated by the trailing edge of each pulse derived from slow clock source 26. To this end, memories 31 and 32 are provided with shift input terminals driven in parallel by the output of slow clock source 26, and responsive to the trailing edge of the slow clock source pulses. Thereby, the most recent indications of the number of defective samples and total number of samples during a sampling interval are stored in the first cells of memories 31 and 32, and similar indications for the sampling intervals removed in time from the present by sampling intervals numbered one, two, etc. are located in cells numbered two, three, etc. After eight sampling intervals have been completed the values stored in the eighth cells of memories 31 and 32 are shifted out of the memory and are discarded. Thereby, memories 31 and 32 respectively have the capability of storing signals indicative of the number of defective samples and total number of samples in each of the eight most recent sampling intervals. Storing the number of defective samples and the number of samples for each of the time intervals enables the system of the present invention to calculate fraction defective on either a short term, medium term or long term basis.

To enable the fraction defective for either a short term, medium term or long term period to be calculated, the signals in the several cells of memories 31 and 32 are respectively supplied to summing matrices 33 and 34, both of which derive multi-bit output signals indicative of the total value of the signals applied thereto. Summing matrices 33 and 34 are responsive to all of the cells in memories 31 and 32 in a time interval no greater than the time between adjacent pulses from slow clock source 26. Within this interval, each of the signals stored in the several cells of memories 31 and 32 is gated to summing matrices 33 or 34, as appropriate, and remain coupled to the summing matrices until completion of fraction defective calculations during the interval. Thereby, during one interval samples are supplied by the cells of memories 31 and 32 to summing matrices 33 and 34 to represent data from periods corresponding with several different length time intervals of the basic interval established by the period between adjacent pulses of slow clock source 26.

To provide information to enable fraction defective for the most recent sampling interval to be derived, the output signals of cells one only, of each of the two memories 31 and 32 are supplied to summing matrices 33 and 34; to derive information for the most recent and the immediately preceding sampling intervals, the signals in cells one and two of memories 31 and 32 are supplied to summing matrices 33 and 34; to derive information for the most recent, penultimate, and antepenultimate sampling intervals, the signals from cells one, two and three of memories 31 and 32 are supplied to summing matrices 33 and 34. The process continues until signals from the eight most recent sampling intervals are all supplied from the eight cells of memories 31 and 32 to matrices 33 and 34.

To these ends, each of the cells of memories 31 and 32 is respectively provided with latched switches 35 and 36, with one of the switches being provided for each of the binary bits of each cell. Thereby, for each five-bit signal stored in each of the eight cells, five latched switches are provided, with a total of forty latched switches being provided for each of the memories 31 and 32. Latched switches 35 and 36 are energized so that they remain closed once energized, until open circuited in response to an appropriate energization voltage. The switches 35 and 36 for the different cells of memories 31 and 32 are closed in sequence, with all switches for cell one being closed first, all of the switches for cell two being closed, etc. until all of the switches for the eight cells of the memories are closed in sequence. After all of switches 35 and 36 have been closed in sequence, they are open circuited simultaneously, unless the fraction defective calculation indicates that a change in setpoint should be made.

To provide for the sequential closing of the different switches 35 and 36 and the simultaneous opening of the switches, a nine stage shift register 37 is provided. Signals are supplied from the sequentially energized first through eighth stages of register 37 to the switches 35 and 36 for the correspondingly numbered cells of memories 31 and 32, to activate the switches into the closed state, where they remain until they are supplied with a command signal causing them to the opened simultaneously. The stages of shift register 37 are energized in sequence at the same frequency as fast clock source 25, so that all of the switches 35 and 36 are closed within one sampling interval, between adjacent pulses of slow clock source 26.

To these ends, the output of fast clock source 25 is supplied to a shift input of register 37 through switch 38 which is closed for a duration of nine fast clock pulses immediately after a slow clock pulse source has been derived. To close switch 38 for the indicated time interval, one-shot multivibrator 39 is provided and is connected so that it is energized in response to the trailing edge of each pulse derived from slow clock source 26. One-shot multivibrator 39 derives a binary one, positive output voltage for a time period equal to approximately nine and one-half fast clock pulses and this binary one voltage closes switch 38, whereby nine pulses from source 25 are invariably coupled to the shift input terminal of register 37 each time switch 38 is closed. To provide for sequential energization of the switches 35 and 36 for the differently numbered cells of memories 31 and 32, signals from the first eight stages of shift register 37 are supplied as energizing voltages to correspondingly numbered switches 35 and 36, causing closing of the switches. To open circuit switches 35 and 36 after a complete closing sequence of switches 35 and 36 having been completed, the ninth stage of shift register 37 is supplied through OR gates 41 and 42 to terminals 43 and 44. In response to the binany one signal from ninth stage of shift register 37 being coupled to terminals 43 and 44, all of switches 35 and 36 are simultaneously open circuited and zero output signals are derived from summing matrices 33 and 34.

To compute fraction defective for each of the several different length sampling time intervals, multi-bit, parallel binary output signals of summing matrices 33 and 34 are supplied to numerator and divisor input terminals of digital division matrix 45. Division matrix 45 derives a multi-bit, parallel binary quotient output signal indicative of fraction defective for the several different length sampling intervals. The output signal of divider 45 therefore represents during each sampling interval of slow clock source 26 a gamut of values for several different length sampling time intervals.

Because the several output signals of divider matrix 45 represent different length sampling intervals, and thereby a different number of total samples, it is preferable to provide a variable deadband for each of the fraction defective computations. The variable deadband is an inverse function of the total number of samples to provide increased confidence in the statistical, fraction defective indications as the number of samples increases, as disclosed in the aforementioned copending Somerville et al application. To provide the variable deadband, the mutli-bit, binary output signal of division matrix 45 is subtracted in digital matrix 47 from a mutli-bit, binary fraction defective setpoint signal derived from source 46. Matrix 47 derives a multi-bit output signal always having a positive polarity indication, regardless of the relative magnitudes of the signals from fraction defective setpoint source 46 and divider 45.

The output signal of substraction matrix 47 is compared in comparator 48 with a signal derived from computer 49 that is indicative of deadband limits for the fraction defective quantity. Computer 49, which is disclosed in detail in the copending Somerville et al., application, causes the deadband to be decreased as the number of samples increases by combining the output signal of summing matrix 34, a binary signal indicative of the total number of samples (N), with three multi-bit, parallel binary signals respectively representing predetermined constants indicative of the correlation (GO4F) between adjacent samples at the frequency of fast clock source 25 (typically GO4F = 1), of a confidence limit (GO3F) (typically GO3F = 0.95) and the fraction defective setpoint (FDS) in accordance with:

$$GO3F \left[ \frac{FDS(1-FDS)GO4F}{N} \right]^{1/2} \quad (1).$$

Comparator 48 responds to the output signals of substraction matrix 47 and computer 49 to derive a binary one signal in response to the subtraction matrix output being greater in magnitude than the computer output signal magnitude; a binary zero level is derived from comparator 48 in response to the subtraction matrix 47 deriving an output signal having a magnitude less than or equal to the magnitude of the output signal of computer 49. Thereby, comparator 48 derives a binary one output signal whenever the fraction defective signal exceeds the deadband and this binary one signal indicates that a change in setpoint should be made. It is seen that comparator 48 is capable of deriving a binary one output in response to the computed fraction defective for the most recent sampling interval being exceeded, or in response to the accumulated fraction defective for any of the last preceding eight sampling intervals being exceeded.

A binary one output signal of comparator 48 functions as an enable input for gates 51, one of which is provided for each of the output bits of division matrix 45. In response to comparator 48 deriving a binary one output signal, gates 51 are opened, to allow the fraction defective signal derived from division matrix 45 to be coupled into storage register 52, so that further processing of the fraction defective signal can be performed to enable the setpoint signal to be changed.

In response to comparator 48 deriving a binary one output signal, a fraction defective computation cycle is reinitiated by clearing memories 31 and 32 and preventing a fraction defective computation until completion of a sampling interval. To this end, the output signal of comparator 48 is supplied to one-shot mutlivibrator 53, which is energized to derive a binary one output signal in response to the trailing edge of the comparator output signal. One-shot multivibrator 53 derives a pulse having a length equal to the interval provided for approximately eight and one-half fast clock pulses from source 25. The binary one output signal of one-shot multivibrator 53 is supplied in parallel to clear input terminals of memories 31 and 32, to erase all the information stored in the eight cells of each of the memories. In addition, the output sginal of one-shot multivibrator 53 is coupled through OR gates 41 and 42 to terminals 43 and 44, thereby open circuiting switches 35 and 36. The binary one level derived from one-shot multivibrator 53 overrides any closing signals for switches 35 and 36, as derived from stages 1-8 of shift register 37, thereby to preclude positively the coupling of signals from the cells of memories 31 and 32 to matrices 33 and 34 until the sampling interval has been completed.

The setpoint signal is computed in response to the output of register 52 in substantially the same manner as described in the copending application of David A. Spitz, Ser. No. 189,252, filed Oct. 14, 1971, for "Control System". In particular, the multi-bit, parallel binary fraction defective (FD) signal derived from register 52 is supplied to computer 54 which computes standard deviation ($\sigma$) in response to the magnitude of the lower reject limit (LL), as derived from a multi-bit, parallel binary output signal of source 21, and a multi-bit, parallel binary signal indicative of the average weight (CSP) of sheet 12, as derived on lead 55. The signal on lead 55 is actually the computed setpoint for the weight of sheet 12 and can be considered to accurately represent the average sheet weight. Computer 54 responds to its input signals to derive a multi-bit, parallel binary output signal in accordance with:

$$\sigma = \frac{(CSP-LL)(FD+0.061)}{0.16+0.47FD} \quad (2)$$

The computed value of standard deviation signal, as derived from computer 54, is combined in computer 56 with the fraction defective output signal of register 52 in accordance with:

$$X\phi = \frac{\sigma(0.16+0.47FD)}{0.061+FD} \quad (3)$$

while the fraction defective setpoint signal derived from source 46 and the computed standard deviation signal derived from computer 54 are combined in computer 57 in accordance with:

$$XI = \frac{\sigma(0.16+0.47FDS)}{0.061+FDS} \quad (4)$$

Computers 56 and 57 derive multi-bit, parallel binary signals that are respectively supplied as subtrahend and minuend signals to subtraction matrix 58 which derives a multi-bit binary signal indicative of the changes which should be made in the setpoint due to the difference between the computed and setpoint values of fraction defective, for the particular standard deviation. The output signal of subtraction matrix 58 is supplied to accumulating register 59, which actually functions as an integrator that derives a multi-bit, parallel output signal indicative of the total change in setpoint signal. The output signal of register 59 is added to multi-bit binary signal derived from source 61, and indicative of an initial setpoint value, typically fed into the system by an operator. The signals from register 59 and source 61 are combined in adding matrix 62 which drives storage register 63 with a multi-bit binary signal. Register 63 thereby derives a multi-bit binary signal indicative of the computed setpoint for the weight of sheet 12, and this setpoint signal is supplied via lead 55 to computer 54, as well as to the positive input of difference network 15 via digital to analog converter 64.

While there has been described and illustrated one specific embodiment of the invention, it will be clear that variations in the details of the embodiment specifically illustrated and described may be made without departing from the true spirit and scope of the invention as defined in the appended claims. For example, the reject limit could be an upper limit for the property value, as disclosed in the aforementioned U.S. Pat. No. 3,622,448. Also, it is to be understood that the special purpose digital computer elements and controller specifically disclosed could be replaced by a properly programmed general purpose digital computer or by an analog computer circuitry.

It is to be understood that, instead of discarding information that is more than 8 sampling intervals old, an additional cell can be added to each of memories 31 and 32. The additional cells accumulated all values derived from the eighth cells of each of the memories, thereby to provide indications of the number of defective samples and total number of samples since the last time a change was made in the setpoint. The signals from the additional cells are supplied to summing matrices 33 and 34 to enable the fraction defective for the accumulating period to be determined.

What is claimed is:

1. In a system for controlling the average value of a material property,
   means for monitoring the property for deriving a first signal indicative of values of the property,
   control means responsive to the comparison of said first signal and a setpoint signal to derive a third signal to control the material average property value, said control means selectively cumulating combinations of said stored signals to derive said setpoint signal,
   means responsive to the first signal for deriving separate signals for each of several different time intervals indicative of the statistical spread of values of the first signal during each of said time intervals;
   means for separately storing said second signals for at least three of said time intervals;
   said control means selectively cumulating combinations of said stored second signals to derive said setpoint signal.

2. The apparatus as claimed in claim 1, wherein said control means cumulates said stored second signals successively, starting from the most recent signals and ending with the oldest stored signals, and compares each of at least a short term, medium term, and long term value for the measurement statistical spread with an expected statistical spread value for each of said terms, to derive said setpoint signal.

3. The apparatus, as claimed in claim 1, wherein said control means cumulates said stored second signals in a time period no greater than the shortest of said time intervals.

4. The apparatus, as claimed in claim 1, wherein said control means varies said setpoint as a function of a comparison between an expected statistical spread of measurement values and a computed statistical spread derived from said cumulated signals for each of said terms, and a function of the number of measurements in said cumulated signals, to increase the response to said comparison as the number of measurements in said cumulated signals increases.

5. In a system for controlling the average value of a material property.
   means for monitoring the property for deriving a first signal indicative of values of the property,
   means responsive to the comparison of said first signal and a setpoint signal to derive a third signal to control the material average property value;
   means responsive to the first signal for deriving separate fourth signals responsive to the number of measurements that fall outside a selected limit of each of at least three different time intervals;
   means for storing separately each of said fourth signals;
   means for deriving separate fifth signals responsive to the total number of measurements made during each of said time intervals;
   means for successively cumulating said fourth signals, beginning with the most recent signal and ending with the oldest stored signal and for successively cumulating said fifth signals, beginning with the most recent signal and ending with the oldest stored signal, and combining said cumulated fourth and fifth signals to derive a sixth signal responsive to the spread of said property measurements for each of said time intervals corresponding to at least a short term, medium term, and long term, said cumulation being completed within a time interval no greater than the shortest of said time intervals;
   means for deriving a seventh signal responsive to the expected statistical spread for said property measurements in each of said terms and varying as a function of the number of measurements in the cumulated signal used in the comparison, to increase response to said sixth signal for control of the material property average as the mumber of cumulated measurements increases; and
   means for separately combining said sixth and seventh signals for each of said terms to derive said setpoint signal.

* * * * *